United States Patent Office 2,841,418
Patented July 1, 1958

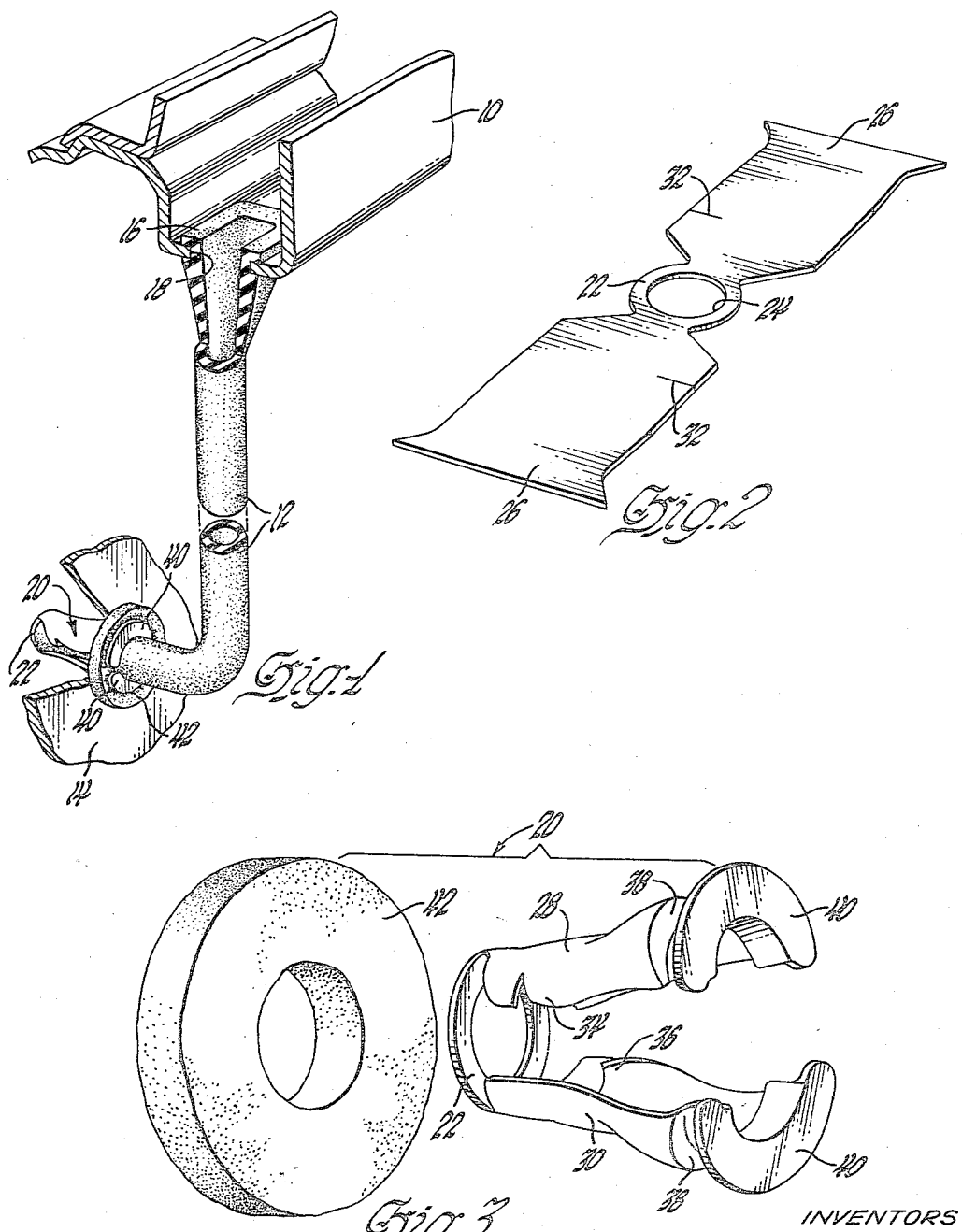

2,841,418

SHEET METAL FASTENER FOR CONNECTING A FLEXIBLE DRAINAGE TUBE TO A PLATE

Bernard H. Keating, Detroit, and Claude P. Sprunk, Pontiac, Mich., assignors to General Motors Corporation, Detroit, Mich., a corporation of Delaware Application December 5, 1955, Serial No. 550,949

1 Claim. (Cl. 285—194)

This invention relates to fasteners generally and more particularly to fastener or connector means for securing the end of a conduit member to a wall formed to receive such member therethrough.

Drainage conduits extended through an obstructing wall are generally required to be extended for some distance beyond the wall to prevent the conduit from falling back on the wrong side of the wall or to have some means of holding the end of the conduit member to the wall.

An improved conduit or hose connector is here proposed which is inexpensively formed and which is effective for its intended purpose of retaining a conduit to a wall through which it extends. The proposed connector or fastener is formed from a stamping having an apertured center member and oppositely extended side members. The side members are formed to the general shape of the member to be received and are bent to extend on the same side of the center member. The side members are formed as complementary spring fingers and have a wall receiving groove, terminating in a flange, formed near the ends thereof. The conduit or hose member is received within the fastener and both are extended through an access in the receiving wall, clamping the spring fingers to the conduit member and being retained by the wall being received within the provided groove.

In the drawing:

Figure 1 shows the proposed fastener as adapted for use.

Figure 2 is a perspective view of the stamping from which the proposed fastener is formed.

Figure 3 is an enlarged exploded view of the proposed fastener means.

The partial section shown in Figure 1 is of a drain trough 10 such as is disposed beneath the ventilator opening in an automotive body. A conduit or hose member 12 is extended between the trough 10 and an obstructing wall or bulkhead 14 such as the fire wall separating the passenger and engine compartments of a vehicle. The hose member 12 includes a lip or flange 16 retaining the one end of the drain member within an opening 18 provided through the trough 10. The other end of the hose member 12 is received through an access (obscured in the drawing) provided in the wall 14 and held by retainer or fastener means 20.

The fastener means 20 is formed from a stamping having a center ring member 22 provided with an opening 24 and oppositely disposed side members 26. The side members are bent tangentially of the apertured member 22, on the same side thereof, and are formed as complementary spring fingers 28 and 30, semi-circular in cross-section, for receiving the hose member 12 therebetween.

The side members are slit as at 32, shown by Figure 2, and are bent inwardly, as shown in Figure 3, to form tangs 34 and 36 for engaging and retaining the end of the hose member 12. Grooves 38 terminating in flanges 40 are formed near the ends of the spring fingers 28 and 30 for receiving the edges of the wall 14, through which the fastener and the end of the hose member are extended, and a soft rubber bushing or gasket 42 is received with the wall 14 within the grooves 38.

The end of hose member 12 abuts ring 22 and the spring fingers 28 and 30 are pressed about the conduit as the conduit with the connector means 20 are passed through the opening in wall 14. The tangs 34 and 36 engage and bite into the hose member to hold it in place. The edge of wall 14 is received within the grooves 38, with the bushing 42, and the spring member sides 28 and 30 spring open to hold the fastener in place relative to wall 14.

What is claimed is:

A sheet metal fastener for retaining a hose member in fixed relation to a wall member having an opening provided therein for receiving said hose member therethrough, said fastener being made of a substantially rectangular sheet metal blank and comprising a ring portion corresponding substantially to the cross section of said hose member, two spaced apart elongated leg portions integral with said ring portion and extending axially from its outer circumference to form a tubular member and terminating in two radially outwardly extending substantially semi-circular flanges, a single inbent tang on each leg portion near said ring portion being formed from opposite side edges of each leg portion, each of said tangs having a substantially triangular configuration defined by a portion of the side edge, an edge extending substantially perpendicular thereto formed by a lateral slit in each leg portion spaced from said ring portion and a bend line extending diagonally from the inner end of said slit away from said ring portion to the side edge, a semi-annular groove in each of said leg portions bordered by one of said flanges, said grooves providing in combination an annular wall receiving groove, said leg portions of the fastener receiving the end portion of said hose member in abutting relation against said ring portion and being clamped to said hose member with said tangs biting therein upon receipt of said fastener and hose within said wall opening and the reception of said wall member within said annular groove.

References Cited in the file of this patent

UNITED STATES PATENTS

| 1,793,883 | Church | Feb. 24, 1931 |
|---|---|---|
| 1,891,315 | Narbo | Dec. 20, 1932 |
| 2,458,409 | Paige | Jan. 4, 1949 |
| 2,555,292 | Poupitch | May 29, 1951 |
| 2,640,672 | Bedford | June 2, 1953 |